US011002830B2

(12) United States Patent
Iida et al.

(10) Patent No.: US 11,002,830 B2
(45) Date of Patent: May 11, 2021

(54) RADAR DEVICE, SIGNAL PROCESSOR, SIGNAL PROCESSING METHOD, AND MOBILE OBJECT

(71) Applicant: SONY SEMICONDUCTOR SOLUTIONS CORPORATION, Kanagawa (JP)

(72) Inventors: Sachio Iida, Kanagawa (JP); Kenichi Kawasaki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 230 days.

(21) Appl. No.: 16/306,050

(22) PCT Filed: May 25, 2017

(86) PCT No.: PCT/JP2017/019628
§ 371 (c)(1),
(2) Date: Nov. 30, 2018

(87) PCT Pub. No.: WO2018/016180
PCT Pub. Date: Jan. 25, 2018

(65) Prior Publication Data
US 2019/0170856 A1 Jun. 6, 2019

(30) Foreign Application Priority Data

Jul. 19, 2016 (JP) .............................. JP2016-141648

(51) Int. Cl.
*G01S 7/35* (2006.01)
*G01S 13/34* (2006.01)
(Continued)

(52) U.S. Cl.
CPC ................ *G01S 7/35* (2013.01); *G01S 7/038* (2013.01); *G01S 7/354* (2013.01); *G01S 13/34* (2013.01);
(Continued)

(58) Field of Classification Search
CPC combination set(s) only.
See application file for complete search history.

(56) References Cited

U.S. PATENT DOCUMENTS

| 5,134,411 | A | 7/1992 | Adler |
| 8,611,394 | B2 * | 12/2013 | Sugino ................ G01S 13/0209 375/130 |

(Continued)

FOREIGN PATENT DOCUMENTS

| JP | H03-091987 | 9/1991 |
| JP | H05-235643 | 9/1993 |

(Continued)

OTHER PUBLICATIONS

International Search Report prepared by the Japan Patent Office dated Aug. 14, 2017, for International Application No. PCT/JP2017/019628.

*Primary Examiner* — Mamadou L Diallo
(74) *Attorney, Agent, or Firm* — Sheridan Ross P.C.

(57) ABSTRACT

To provide a radar device, capable of eliminating the influence based on the local feedthrough in the FMCW radar device. There is provided a radar device including: an oscillator configured to oscillate a local signal; a transmitting antenna configured to emit a transmission signal based on the local signal; a receiving antenna configured to receive a reflected wave in which the transmission signal is reflected from a target; a mixer configured to multiply the reflected wave and the local signal by each other to produce a multiplied signal; and a first shifter provided between the oscillator and the mixer and configured to shift a phase of the local signal.

20 Claims, 7 Drawing Sheets

(51) Int. Cl.
*G01S 7/03* (2006.01)
*G01S 13/931* (2020.01)
*G01S 13/87* (2006.01)

(52) U.S. Cl.
CPC .......... *G01S 13/343* (2013.01); *G01S 13/931* (2013.01); *G01S 13/87* (2013.01); *G01S 2013/93271* (2020.01); *G01S 2013/93272* (2020.01)

(56) References Cited

U.S. PATENT DOCUMENTS

| | | |
|---|---|---|
| 2007/0285307 A1* | 12/2007 | Nishijima ................. G01S 7/35 342/200 |
| 2012/0001791 A1 | 1/2012 | Wintermantel |
| 2017/0026207 A1* | 1/2017 | Kakinuma ............. H04L 27/22 |
| 2017/0199270 A1* | 7/2017 | Huemer ................ G01S 7/4021 |
| 2017/0310758 A1* | 10/2017 | Davis ..................... G01S 13/931 |
| 2018/0136323 A1* | 5/2018 | Pozdniakov ............ G01S 13/88 |
| 2019/0079179 A1* | 3/2019 | Kitamura ............. G01S 13/931 |

FOREIGN PATENT DOCUMENTS

| | | |
|---|---|---|
| JP | H09-080148 | 3/1997 |
| JP | 2012-522972 | 9/2012 |

* cited by examiner

RADAR DEVICE, SIGNAL PROCESSOR, SIGNAL PROCESSING METHOD, AND MOBILE OBJECT

CROSS REFERENCE TO RELATED APPLICATIONS

This application is a national stage application under 35 U.S.C. 371 and claims the benefit of PCT Application No. PCT/JP2017/019628 having an international filing date of 25 May 2017, which designated the United States, which PCT application claimed the benefit of Japanese Patent Application No. 2016-141648 filed 19 Jul. 2016, the entire disclosures of each of which are incorporated herein by reference.

TECHNICAL FIELD

The present disclosure relates to a radar device, a signal processor, a signal processing method, and a mobile object.

BACKGROUND ART

A frequency-modulated continuous-wave (FMCW) radar device is employed as a vehicle-mounted radar device in some cases. The ranging performed by the FMCW radar device is as follows. A chirp signal in which frequency linearly increases or decreases with time is emitted as a transmission signal from a transmitting antenna, and an echo signal reflected back from a target is caught by a receiving antenna. Then, a local signal chirped at the same frequency as the transmission signal and the echo signal are multiplied by each other in a mixer and are subjected to direct conversion reception. Then, at the time of direct conversion reception, the frequency of the local signal varies during the round trip time until the transmitted signal is reflected back from the target, so a beat signal of the frequency proportional to the distance to the target occurs.

It is known that the direct conversion reception causes occurrence of a DC component based on a local feedthrough where the local signal leaks from the receiving antenna due to incomplete isolation between LO (local) and RF of a mixer. Thus, in one example, there is a technique for eliminating the DC component based on the local feedthrough, as disclosed in Patent Literature 1.

CITATION LIST

Patent Literature

Patent Literature 1: JP H5-235643A

DISCLOSURE OF INVENTION

Technical Problem

However, in the case of the FMCW radar device, both the transmission signal and the local feedthrough are chirp signals, so it is difficult to apply the technique for eliminating the DC component as disclosed in Patent Literature 1.

In view of this, the present disclosure provides a novel and improved radar device, signal processor, signal processing method, and mobile object, capable of eliminating the influence based on the local feedthrough in the FMCW radar device.

Solution to Problem

According to the present disclosure, there is provided a radar device including: an oscillator configured to oscillate a local signal; a transmitting antenna configured to emit a transmission signal based on the local signal; a receiving antenna configured to receive a reflected wave in which the transmission signal is reflected from a target; a mixer configured to multiply the reflected wave and the local signal by each other to produce a multiplied signal; and a first shifter provided between the oscillator and the mixer and configured to shift a phase of the local signal.

In addition, according to the present disclosure, there is provided a signal processor including: an oscillator configured to oscillate a local signal; a mixer configured to multiply a reflected wave in which a transmission signal based on the local signal is reflected from a target and the local signal by each other to produce a multiplied signal; and a shifter provided between the oscillator and the mixer and configured to shift a phase of the local signal.

In addition, according to the present disclosure, there is provided a signal processing method including: oscillating, by an oscillator, a local signal; emitting a transmission signal based on the local signal from a transmitting antenna; receiving, by a receiving antenna, a reflected wave in which the transmission signal is reflected from a target; multiplying, by a mixer, the reflected wave and the local signal by each other to produce a multiplied signal; and shifting, by a shifter provided between the oscillator and the mixer, a phase of the local signal.

Further, according to the present disclosure, there is provided a mobile object including the radar device described above.

Advantageous Effects of Invention

According to the present disclosure as described above, there is provided a novel and improved radar device, signal processor, signal processing method, and mobile object, capable of eliminating the influence based on the local feedthrough in the FMCW radar device.

Note that the effects described above are not necessarily limitative. With or in the place of the above effects, there may be achieved any one of the effects described in this specification or other effects that may be grasped from this specification.

MODES FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the following order.
1. Embodiment of present disclosure
1.1. Overview
1.2. Configuration example
1.2.1. First configuration example
1.2.2. Second configuration example
1.2.3. Third configuration example
1.3. Application example
2. Concluding remarks

1. EMBODIMENT OF PRESENT DISCLOSURE

1.1. OVERVIEW

An overview of an embodiment of the present disclosure will be described and then the embodiment of the present disclosure will be described in detail.

As described above, an FMCW radar device is employed as a vehicle-mounted radar device in some cases. The ranging performed by the FMCW radar device is as follows. A chirp signal in which frequency linearly increases or decreases with time is emitted as a transmission signal from a transmitting antenna, and an echo signal reflected back from a target is caught by a receiving antenna. Then, a local signal chirped at the same frequency as the transmission signal and the echo signal are multiplied by each other in a mixer and are subjected to direct conversion reception. Then, at the time of direct conversion reception, the frequency of the local signal varies during the round trip time until the transmitted signal is reflected back from the target, so a beat signal of the frequency proportional to the distance to the target occurs.

Figure 1:
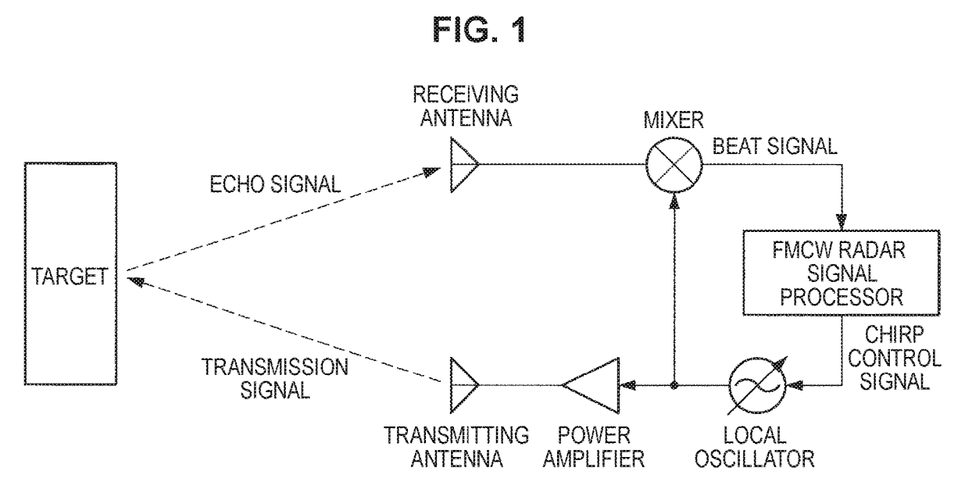
FIG. 1 is a diagram illustrated to describe a configuration example of an FMCW radar device.

FIG. 1 is a diagram illustrated to describe a configuration example of the FMCW radar device. In the FMCW radar device illustrated in FIG. 1, a local oscillator outputs a local signal on the basis of a chirp control signal sent from an FMCW radar signal processor. The local signal output from the local oscillator is amplified by a power amplifier and then is emitted as a transmission signal from a transmitting antenna.

The transmission signal is reflected from a target. The receiving antenna receives an echo signal reflected back from the target. The echo signal received by the receiving antenna is multiplied by the local signal in the mixer to produce a beat signal. The beat signal is sent to the FMCW radar signal processor and is used for ranging the distance to the target.

Figure 2:
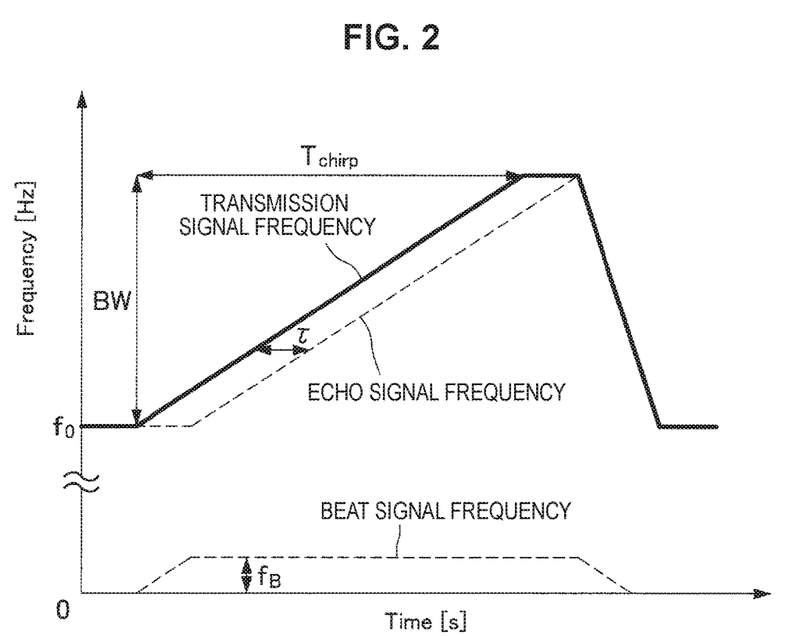
FIG. 2 is a diagram illustrated to describe an example of a frequency of a transmission signal, a frequency of an echo signal, and a frequency of a beat signal, which vary with time.

FIG. 2 is a diagram illustrated to describe an example of a frequency of a transmission signal, a frequency of an echo signal, and a frequency of a beat signal, which vary with time. The frequency of the transmission signal increases linearly with time from $f_0$ to $f_0+BW$. The echo signal linearly increases with time from $f_0$ to $f_0+BW$ with a delay of a round trip time $\tau$ until the transmission signal is reflected back from the target. The frequency $f_B$ of the beat signal is proportional to the round trip time $\tau$ until the transmission signal is reflected back from the target. Thus, the FMCW radar device is capable of recognizing the distance to the target by getting to know the frequency $f_B$ of the beat signal.

It is generally known that the direct conversion reception causes a local feedthrough where the local signal leaks from the receiving antenna due to incomplete isolation between LO (local) and RF. In addition, it is known that, when the frequency of the local signal does not vary with time, the local feedthrough returns to the receiving antenna and the local feedthrough is multiplied by the local signal in the mixer, resulting in a DC component. Thus, in one example, as disclosed in Patent Literature 1, there is a technique of eliminating the DC component based on the local feedthrough using AC coupling (serial capacitors) or a high-pass filter.

However, in the case of the FMCW radar device, the transmission signal emitted from the transmitting antenna and the local feedthrough leaked from the receiving antenna are both chirp signals. Thus, the elimination using AC coupling or a high-pass filter fails to be achieved.

Figure 3:
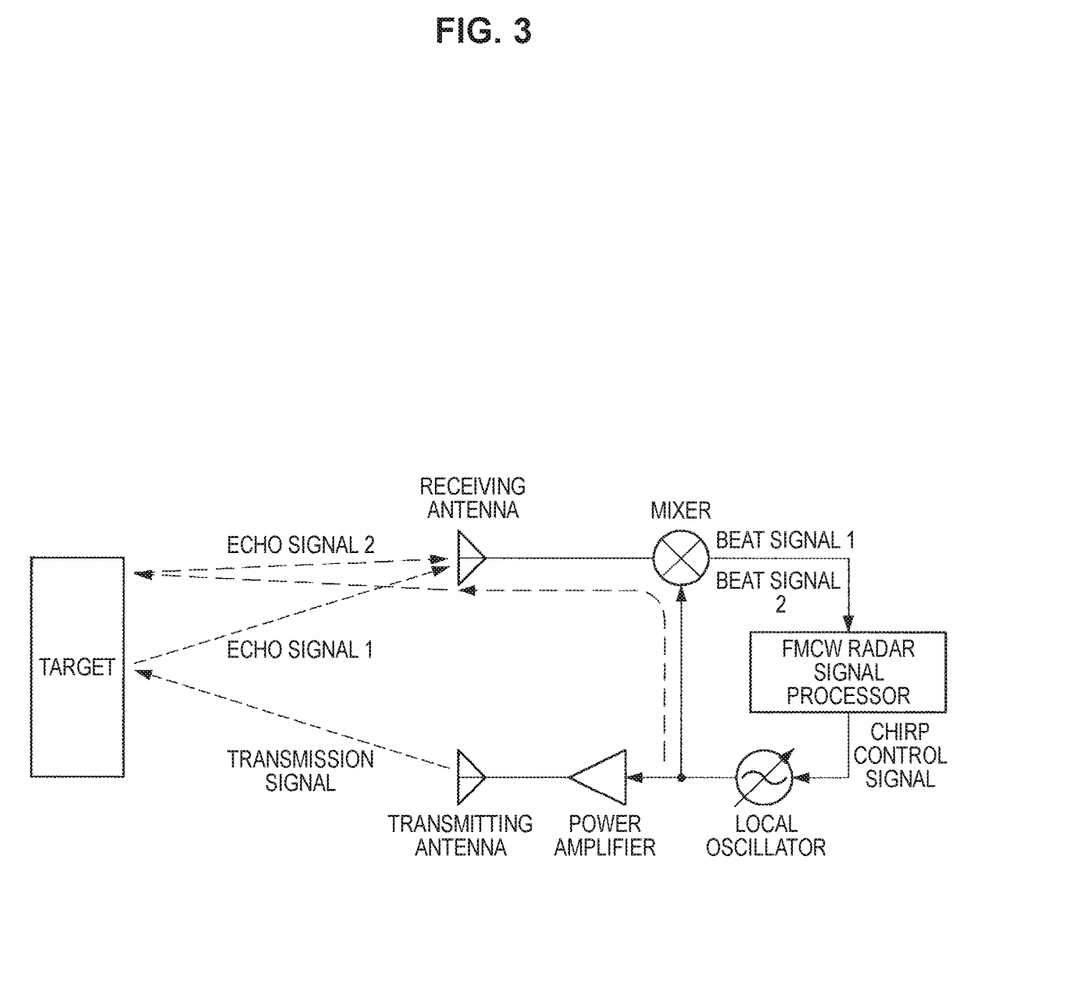
FIG. 3 is a diagram illustrated to describe influence caused by a local feedthrough in the FMCW radar device.

FIG. 3 is a diagram illustrated to describe the influence caused by local feedthrough in the FMCW radar device. The transmission signal emitted from the transmitting antenna is reflected from the target and becomes an echo signal 1. On the other hand, the local feedthrough leaked from the receiving antenna is reflected from the target and becomes an echo signal 2. The respective echo signals received by the receiving antenna are multiplied by the local signal in the mixer to produce beat signals 1 and 2. These two beat signals fail to be separated because they have the same frequency, and the beat signal 2 caused by the local feedthrough fail to be eliminated using AC coupling or a high-pass filter.

Thus, in view of the above-mentioned points, those who conceived the present disclosure have conducted intensive studies on the technology capable of eliminating the influence based on the local feedthrough in the FMCW radar device. Accordingly, those who conceived the present disclosure have devised the technology capable of eliminating the influence based on the local feedthrough in the FMCW radar device by using a phase shifter as described below.

The overview of the embodiment of the present disclosure is described above. The embodiment of the present disclosure is now described in detail.

1.2. CONFIGURATION EXAMPLE

1.2.1. First Configuration Example

Figure 4:
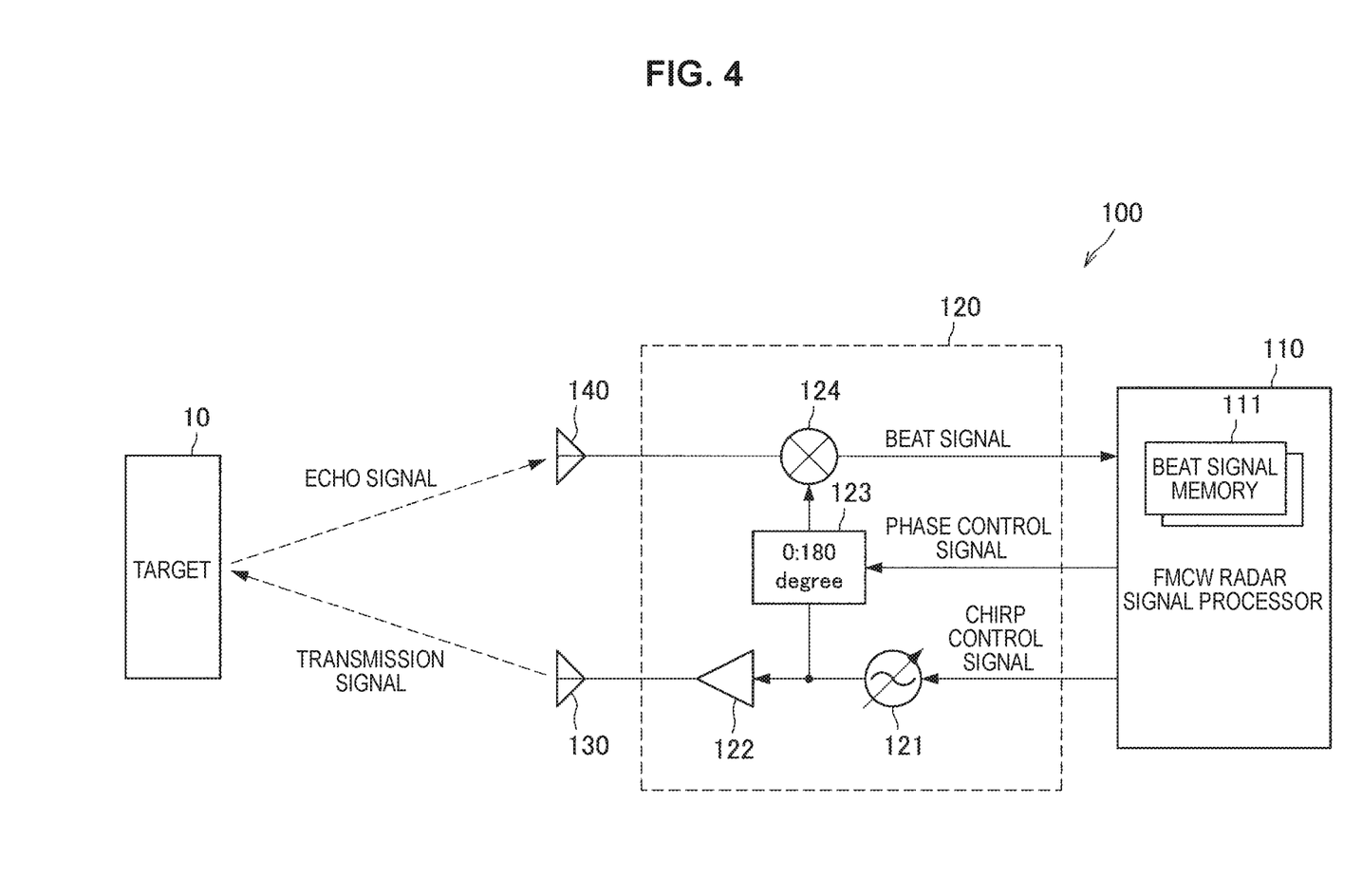
FIG. 4 is a diagram illustrated to describe a first configuration example of the FMCW radar device according to an embodiment of the present disclosure.

FIG. 4 is a diagram illustrated to describe a first configuration example of the FMCW radar device according to the embodiment of the present disclosure. The first configuration example of the FMCW radar device is now described with reference to FIG. 4.

As illustrated in FIG. 4, the FMCW radar device 100 includes an FMCW radar signal processor 110, a signal processing unit 120, a transmitting antenna 130, and a receiving antenna 140.

The FMCW radar signal processor 110 controls the operation of the signal processing unit 120 and also calculates the distance between the FMCW radar device 100 and a target 10. The FMCW radar signal processor 110 includes a beat signal memory 111. The beat signal memory 111 temporarily stores a beat signal used to calculate the distance between the FMCW radar device 100 and the target 10.

The signal processing unit 120 includes a local oscillator 121, a power amplifier 122, a phase shifter 123, and a mixer 124.

The local oscillator 121 generates a local signal whose frequency varies with time (chirped) on the basis of a chirp control signal from the FMCW radar signal processor 110. The local oscillator 121 outputs the generated local signal to the power amplifier 122 and the phase shifter 123.

The power amplifier 122 amplifies the local signal generated by the local oscillator 121. The local signal amplified by the power amplifier 122 is sent to the transmitting antenna 130 and is transmitted as a transmission signal from the transmitting antenna 130.

The phase shifter 123 shifts the phase of the local signal generated by the local oscillator 121 by a predetermined amount. The phase shifter 123 shifts the local signal by a shift amount based on a phase control signal that is output from the FMCW radar signal processor 110.

The present embodiment acquires twice the beat signal to eliminate the influence based on the local feedthrough. In the first-time acquisition, the phase shifter 123 shifts the phase of the local signal by 0 degrees (i.e., no change in phase) on the basis of the phase control signal. In the second-time acquisition, the phase shifter 123 shifts the phase of the local signal by 180 degrees (i.e., a change in phase opposite to the phase in the first-time acquisition) on the basis of the phase control signal.

The mixer 124 multiplies the output of the phase shifter 123 by an echo signal received by the receiving antenna 140. The mixer 124, when multiplying the two signals by each other, outputs the resultant multiplied signal (beat signal) to the FMCW radar signal processor 110.

Figure 5:
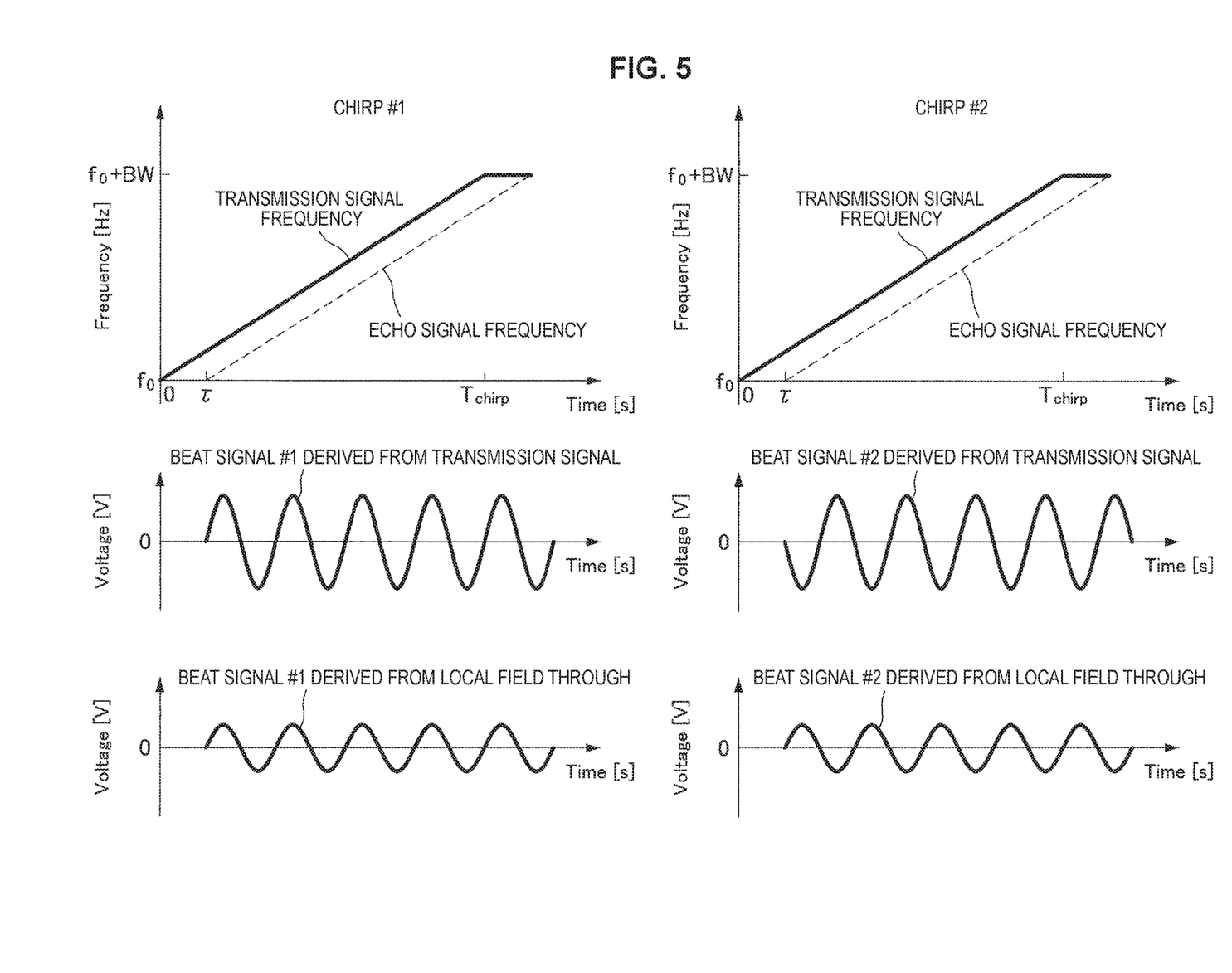
FIG. 5 is a diagram illustrated to describe a beat signal derived from a transmission signal and a beat signal derived from a local feedthrough, in a first-time chirp and a second-time chirp.

FIG. 5 is a diagram illustrated to describe the beat signal derived from the transmission signal and the beat signal derived from the local feedthrough, in the first-time chirp and the second-time chirp. The beat signals generated twice are stored in the beat signal memory 111. Then, the second-time beat signal is subtracted from the first-time beat signal.

As illustrated in FIG. 5, the phases of the beat signals derived from the transmission signal differ by 180 degrees between the first-time chirp and the second-time chirp by the phase shifter 123, so the beat signals are added by subtracting the second-time beat signal from the first-time beat signal. On the other hand, as illustrated in FIG. 5, the phases of the beat signals derived from the local feedthrough are the same between the first-time chirp and the second-time chirp, so the beat signals are cancelled by subtracting the second-time beat signal from the first-time beat signal.

In other words, the phase shifter 123 that shifts the local signal makes it possible for the FMCW radar device 100 according to the present embodiment to eliminate the influence based on the local feedthrough. Details thereof will be described later.

The transmitting antenna 130 transmits the local signal amplified by the power amplifier 122 in a predetermined direction as a transmission signal. The receiving antenna 140 receives an echo signal in which the transmission signal transmitted from the transmitting antenna 130 is reflected back from the target 10. The echo signal received by the receiving antenna 140 is sent to the mixer 124 described above.

The first configuration example of the FMCW radar device is described above with reference to FIG. 4. The operation of the FMCW radar device illustrated in FIG. 4 is now described.

The description is first given of the addition between the beat signals derived from the transmission signal in subtracting the second-time beat signal from the first-time beat signal when the phase is shifted by 180 degrees by the phase shifter.

The frequency of the transmission signal increases linearly with time from $f_0$ to $f_0+BW$ by the chirp as expressed in Formula (1) below. Moreover, although this example illustrates that the frequency of the transmission signal increases linearly with time, the frequency can decrease linearly with time. In addition, the frequency of the transmission signal can increase or decrease with time in a form other than linear.

[Math. 1]
$$f_{TX}(t) = \frac{BW}{T_{chirp}}t + f_0 \ (0 \leq t \leq T_{chirp}) \tag{1}$$

In this event, the phase of the transmission signal is obtained by time integrating the frequency, so it becomes a quadratic function of the time τ as expressed in Formula (2) below.

[Math. 2]
$$\varphi_{TX}(t) = 2\pi\left(\frac{BW}{2T_{chirp}}t^2 + f_0 t\right) \tag{2}$$

Further, the phase of the echo signal is delayed by the time τ when it takes the transmission signal to reciprocate the distance to the target, so resulting in Formula (3) below.

[Math. 3]
$$\varphi_{Echo}(t) = \varphi_{TX}(t-\tau) = 2\pi\left\{\frac{BW}{2T_{chirp}}(t-\tau)^2 + f_0(t-\tau)\right\} \tag{3}$$

The beat signal in the first-time chirp is first obtained. In the phase of the local signal input to the mixer 124, the shift amount by the phase shifter 123 is set to 0 degrees in the first-time chirp, so the phase has the same phase as the transmission signal, as expressed in Formula (4) below.

[Math. 4]
$$\varphi_{LO1}(t) = 2\pi\left(\frac{BW}{2T_{chirp}}t^2 + f_0 t\right) \tag{4}$$

When the mixer 124 multiplies the local signal by the echo signal, a phase difference between the local signal and the echo signal becomes the phase of the beat signal as expressed in Formula (5).

[Math. 5]
$$\varphi_{Beat1}(t) = \varphi_{LO1}(t) - \varphi_{Echo}(t) = 2\pi\left\{\frac{BW}{2T_{chirp}}(2\tau t - \tau^2) + f_0\tau\right\} \tag{5}$$

In Formula (5), $\tau^2$ is sufficiently smaller than the other terms and so can be omitted. Assuming that the amplitude of the beat signal is set to A, the beat signal in the first-time chirp is as expressed in Formula (6) below.

[Math. 6]

$$S_{Beat1}(t) = A\cos\left\{2\pi\left(\frac{BW}{T_{chirp}}\tau t + f_0\tau\right)\right\} \quad (6)$$

The beat signal in the second-time chirp is then obtained. In the phase of the local signal input to the mixer 124, the shift amount by the phase shifter 123 is set to 180 degrees in the second-time chirp, so the phase becomes a phase obtained by adding $\pi$ to Formula (4), as expressed in Formula (7) below.

[Math. 7]

$$\varphi_{LO2}(t) = 2\pi\left(\frac{BW}{2T_{chirp}}t^2 + f_0 t\right) + \pi \quad (7)$$

When the mixer 124 multiplies the local signal by the echo signal, the phase difference between the local signal and the echo signal becomes the phase of the beat signal as expressed in Formula (8).

[Math. 8]

$$\varphi_{Beat2}(t) = \varphi_{LO2}(t) - \varphi_{Echo}(t) = 2\pi\left\{\frac{BW}{2T_{chirp}}(2\tau t - \tau^2) + f_0\tau\right\} + \pi \quad (8)$$

In Formula (8), $\tau^2$ is sufficiently smaller than the other terms and so can be omitted, which is similar to Formula (5). Assuming that the amplitude of the beat signal is set to A, the beat signal in the second-time chirp is as expressed in Formula (9) below.

[Math. 9]

$$S_{Beat2}(t) = A\cos\left\{2\pi\left(\frac{BW}{T_{chirp}}\tau t + f_0\tau\right) + \pi\right\} = -A\cos\left\{2\pi\left(\frac{BW}{T_{chirp}}\tau t + f_0\tau\right)\right\} \quad (9)$$

The second-time beat signal is subtracted from the first-time beat signal obtained in this way, resulting in Formula (10).

[Math. 10]

$$S_{Beat}(t) = S_{Beat1}(t) - S_{Beat2}(t) = 2A\cos\left\{2\pi\left(\frac{BW}{T_{chirp}}\tau t + f_0\tau\right)\right\} \quad (10)$$

Thus, as expressed in Formula (10), when the phase is shifted by 180 degrees by the phase shifter, it is found that the beat signals derived from the transmission signal are added in subtracting the second-time beat signal from the first-time beat signal.

Then, the description is given of the cancellation of the beat signal derived from the local feedthrough in subtracting the second-time beat signal from the first-time beat signal when the phase is shifted by 180 degrees by the phase shifter.

The beat signal in the first-time chirp is first obtained. In the phase of the local signal input to the mixer 124, the shift amount by the phase shifter 123 is set to 0 degrees in the first-time chirp, so the phase has the same phase as the transmission signal, as expressed in Formula (11) below. The local feedthrough is the leakage of the local signal input to the mixer 124, so the phase of the local feedthrough is the same as the phase of the local signal.

[Math. 11]

$$\varphi_{LOFT1}(t) = \varphi_{LO1}(t) = 2\pi\left(\frac{BW}{2T_{chirp}}t^2 + f_0 t\right) \quad (11)$$

The phase of the echo signal derived from the local feedthrough is delayed by the time $\tau$ of reciprocating the distance to the target, so resulting in Formula (12) below.

[Math. 12]

$$\varphi_{Echo1}(t) = \varphi_{LOFT1}(t - \tau) = 2\pi\left\{\frac{BW}{2T_{chirp}}(t - \tau)^2 + f_0(t - \tau)\right\} \quad (12)$$

The phase of the beat signal is expressed by Formula (13) by allowing the mixer 124 to output the phase difference between the local signal and the echo signal.

[Math. 13]

$$\varphi_{Beat1}(t) = \varphi_{LO1}(t) - \varphi_{Echo1}(t) = 2\pi\left\{\frac{BW}{2T_{chirp}}(2\tau t - \tau^2) + f_0\tau\right\} \quad (13)$$

In Formula (13), $\tau^2$ is sufficiently smaller than the other terms and so can be omitted. Assuming that the amplitude of the beat signal is set to B, the beat signal caused by the local feedthrough in the first-time chirp is expressed in Formula (14) below.

[Math. 14]

$$S_{Beat1}(t) = B\cos\left\{2\pi\left(\frac{BW}{T_{chirp}}\tau t + f_0\tau\right)\right\} \quad (14)$$

The beat signal in the second-time chirp is then obtained. In the phase of the local signal input to the mixer 124, the shift amount by the phase shifter 123 is set to 180 degrees in the second-time chirp, so the phase becomes a phase obtained by adding $\pi$ to Formula (11), as expressed in Formula (15) below.

[Math. 15]

$$\varphi_{LOFT2}(t) = \varphi_{LO2}(t) = 2\pi\left(\frac{BW}{2T_{chirp}}t^2 + f_0 t\right) + \pi \quad (15)$$

The phase of the echo signal derived from the local feedthrough is delayed by the time $\tau$ of reciprocating the distance to the target, so resulting in Formula (16) below.

[Math. 16]

$$\varphi_{Echo2}(t) = \varphi_{LOFT2}(t - \tau) = 2\pi\left\{\frac{BW}{2T_{chirp}}(t - \tau)^2 + f_0(t - \tau)\right\} + \pi \quad (16)$$

The phase of the beat signal is expressed by Formula (17) by allowing the mixer 124 to output the phase difference between the local signal and the echo signal.

[Math. 17]

$$\varphi_{Beat2}(t) = \varphi_{LO2}(t) - \varphi_{Echo2}(t) = 2\pi\left\{\frac{BW}{2T_{chirp}}(2\tau t - \tau^2) + f_0\tau\right\} \quad (17)$$

In Formula (17), $\tau^2$ is sufficiently smaller than the other terms and so can be omitted, which is similar to Formula (13). Assuming that the amplitude of the beat signal is set to B, the beat signal caused by the local feedthrough in the second-time chirp is as expressed in Formula (18) below.

[Math. 18]

$$S_{Beat2}(t) = B\cos\left\{2\pi\left(\frac{BW}{T_{chirp}}\tau t + f_0\tau\right)\right\} \quad (18)$$

The subtraction of the second-time beat signal from the first-time beat signal obtained in this way produces Formula (19).

[Math. 19]

$$S_{Beat}(t) = S_{Beat1}(t) - S_{Beat2}(t) = 0 \quad (19)$$

In other words, it can be found that, as expressed in Formula 19, the beat signals caused by the local feedthrough are canceled in subtracting the beat signal caused by the second-time local feedthrough from the beat signal caused by the first-time local feedthrough when the phase is shifted by 180 degrees by the phase shifter.

Thus, the FMCW radar device 100 according to the embodiment of the present disclosure, when acquiring twice the beat signal obtained by allowing the phase shifter to shift the local signal by 180 degrees, makes it possible to cancel the beat signal caused by the local feedthrough, thereby obtaining only the beat signal derived from the local signal. The FMCW radar device 100 according to the embodiment of the present disclosure is capable of cancelling the beat signal caused by the local feedthrough and obtaining only the beat signal derived from the local signal, thereby achieving accurate measurement of the distance to the target.

1.2.2. Second Configuration Example

Figure 6:
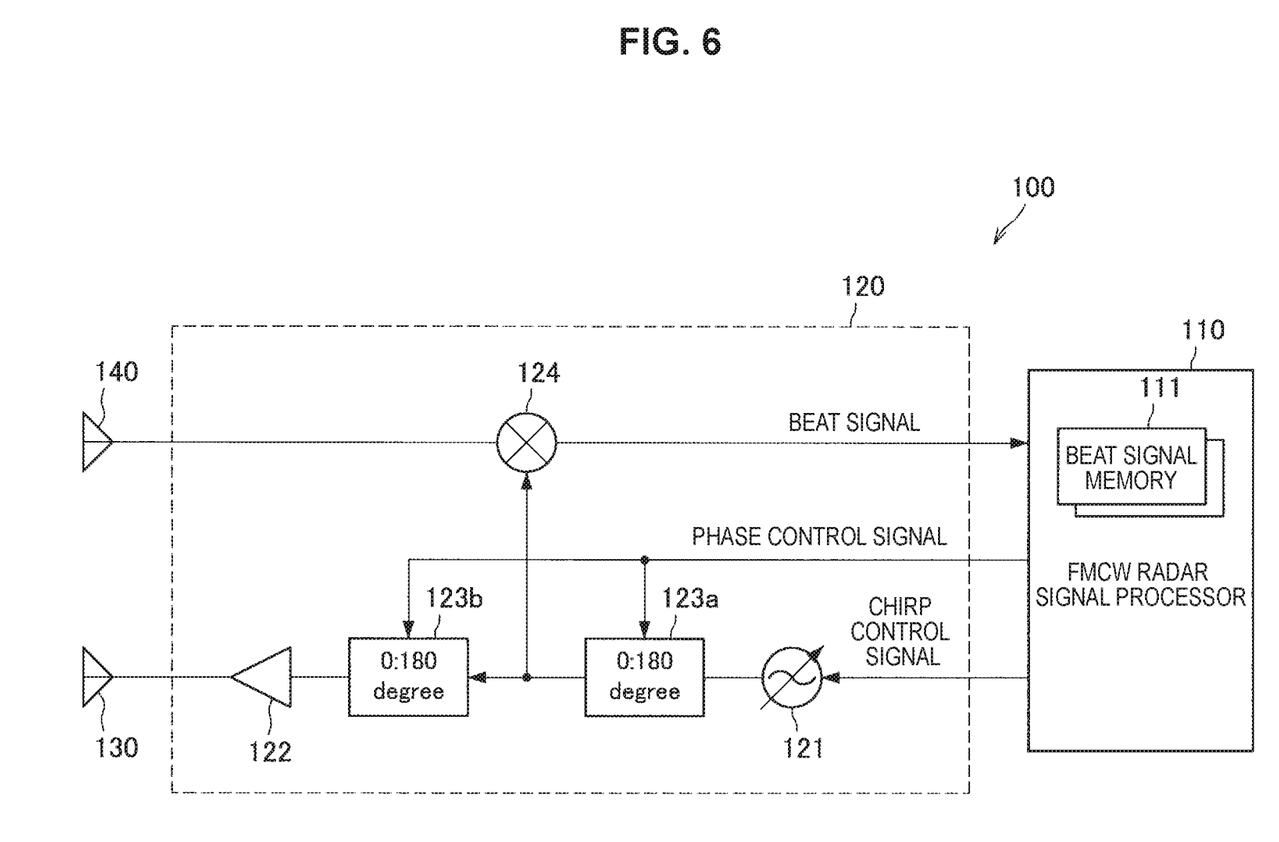
FIG. 6 is a diagram illustrated to describe a second configuration example of the FMCW radar device according to the present embodiment.

A second configuration example of the FMCW radar device is now described. FIG. 6 is a diagram illustrated to describe the second configuration example of the FMCW radar device according to the embodiment of the present disclosure. The second configuration example of the FMCW radar device illustrated in FIG. 6 differs from the first configuration example illustrated in FIG. 4 in that two phase shifters are provided.

A phase shifter 123a shifts the phase of the local signal generated by the local oscillator 121 by a predetermined amount, which is similar to the first configuration example illustrated in FIG. 4. The phase shifter 123a shifts the local signal by the shift amount based on the phase control signal that is output from the FMCW radar signal processor 110. In one example, the phase shifter 123a shifts the phase by 0 degrees or 180 degrees on the basis of the phase control signal. The output from the phase shifter 123a is sent to the mixer 124 and a phase shifter 123b.

The phase shifter 123b further shifts the phase of the signal output from the phase shifter 123a by a predetermined amount. The phase shifter 123b shifts the signal output from the phase shifter 123a by the shift amount based on the phase control signal that is output from the FMCW radar signal processor 110. In one example, the phase shifter 123b shifts the phase by 0 degrees or 180 degrees on the basis of the phase control signal.

The shift amounts twice by the phase shifters 123a and 123b are set so that the phases are the same as the local signal generated by the local oscillator 121. In addition, the shift amounts by the phase shifters 123a and 123b are set so that the beat signal derived from the transmission signal is different in phase by 180 degrees between the first-time chirp and the second-time chirp, as in the first configuration example.

Specifically, in the FMCW radar device illustrated in FIG. 6, the beat signal derived from the transmission signal is made to be different in phase by 180 degrees between the first-time chirp and the second-time chirp by the phase shifter 123a, as in the first configuration example of the FMCW radar device illustrated in FIG. 4. Thus, the signals are added by subtracting the second-time beat signal from the first-time beat signal. On the other hand, the beat signal derived from the local feedthrough is identical in phase between the first-time chirp and the second-time chirp, so it is canceled by subtracting the second-time beat signal from the first-time beat signal.

In other words, the phase shifter 123 that shifts the local signal makes it possible for the FMCW radar device 100 according to the present embodiment to eliminate the influence based on the local feedthrough.

1.2.3. Third Configuration Example

Figure 7:
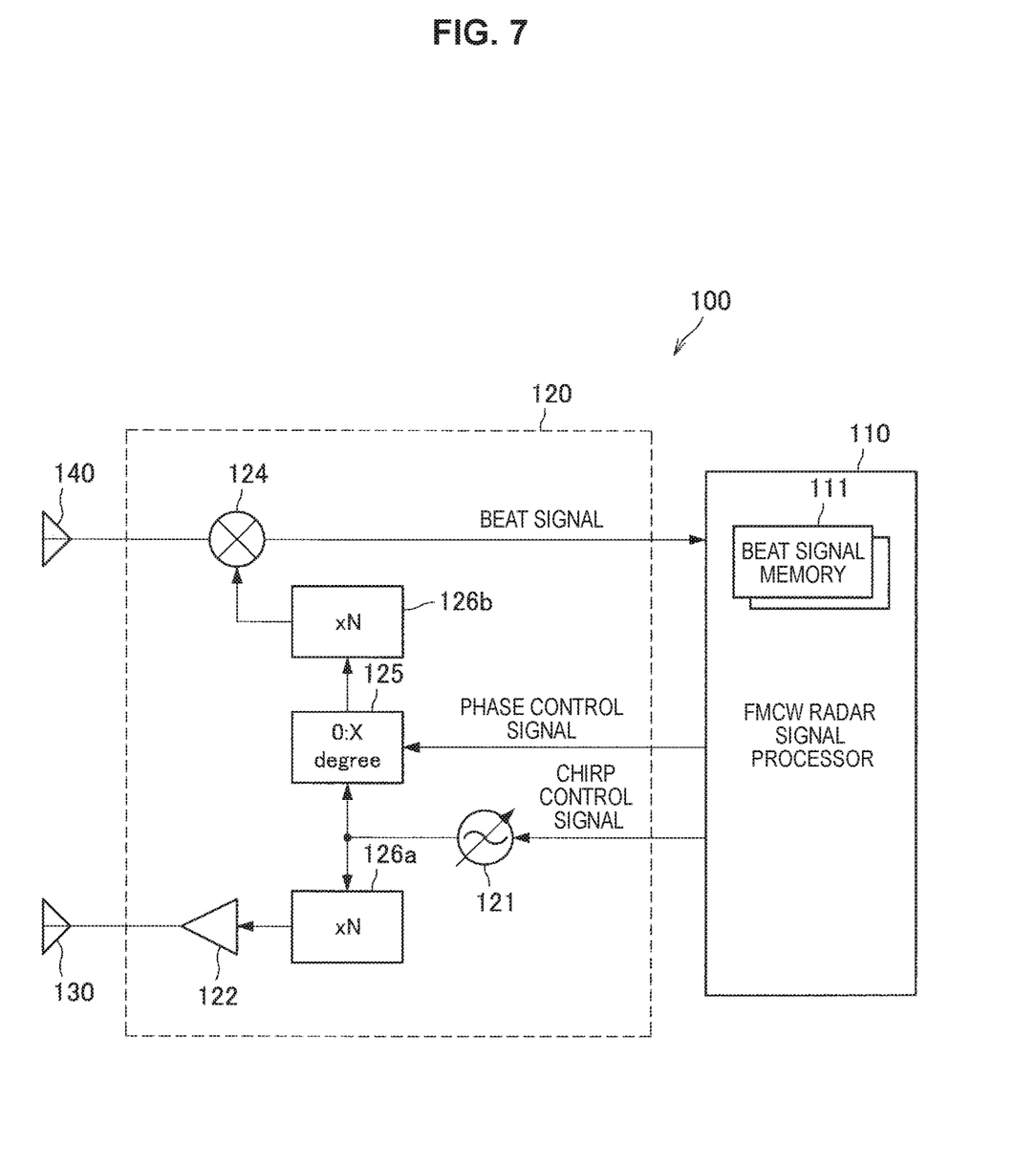
FIG. 7 is a diagram illustrated to describe a third configuration example of the FMCW radar device according to the present embodiment.

A third configuration example of the FMCW radar device is now described. FIG. 7 is a diagram illustrated to describe a third configuration example of the FMCW radar device according to the embodiment of the present disclosure. The third configuration example of the FMCW radar device illustrated in FIG. 7 differs from the first configuration example illustrated in FIG. 4 in that a transmission signal multiplier 126a and a local signal multiplier 126b are provided. In addition, in the third configuration example of the FMCW radar device illustrated in FIG. 7, the shift amount by a phase shifter 125 is determined on the basis of the multiplication amounts of the transmission signal multiplier 126a and the local signal multiplier 126b.

The transmission signal multiplier 126a multiplies the frequency of the local signal output from the local oscillator 121 by N times. In addition, the local signal multiplier 126b multiplies the frequency of the local signal whose phase is shifted by the phase shifter 125 by N times. The phase shifter 125 shifts the phase of the local signal output from the local oscillator 121 by the shift amount based on the phase control signal output from the FMCW radar signal processor 110. In the example illustrated in FIG. 7, the phase shifter 125 shifts the phase of the local signal output from the local oscillator 121 by 0 degrees or X degrees.

The shift amount X by the phase shifter 125 and the multiplication amount N by the transmission signal multiplier 126a and the local signal multiplier 126b are assumed to have the following relationship.

[Math. 20]

$$\mathrm{mod}(N \cdot X, 360) = 180 \quad (20)$$

In other words, the shift amount X by the phase shifter 125 is set to a value that becomes 180 when it is multiplied by N times and is wrapped at 360. In one example, X=180/N or X=180+180/N if N is an even number, and X=180/N or X=180 if N is an odd number.

In the FMCW radar device 100 illustrated in FIG. 7, the transmission signal multiplier 126a provided as described above makes it possible for the transmission signal to increase in frequency and to be transmitted even when the local oscillator 121 fails to oscillate at a high frequency. In addition, the FMCW radar device 100 illustrated in FIG. 7 provided with the local signal multiplier 126b makes it possible to make the phase of the local signal different by 180 degrees between two chirps, which is similar to the first configuration example and the second configuration example described above. Then, the FMCW radar device 100 illustrated in FIG. 7 cancels the beat signal derived from the local feedthrough by subtracting the second-time beat signal from the first-time beat signal.

1.3. APPLICATION EXAMPLE

The FMCW radar device 100 according to the embodiment of the present disclosure is capable of eliminating the influence based on the local feedthrough, so it is applicable to a radar device of a system supporting safe driving of a car, which is necessary to perform ranging with high accuracy.

Figure 8:
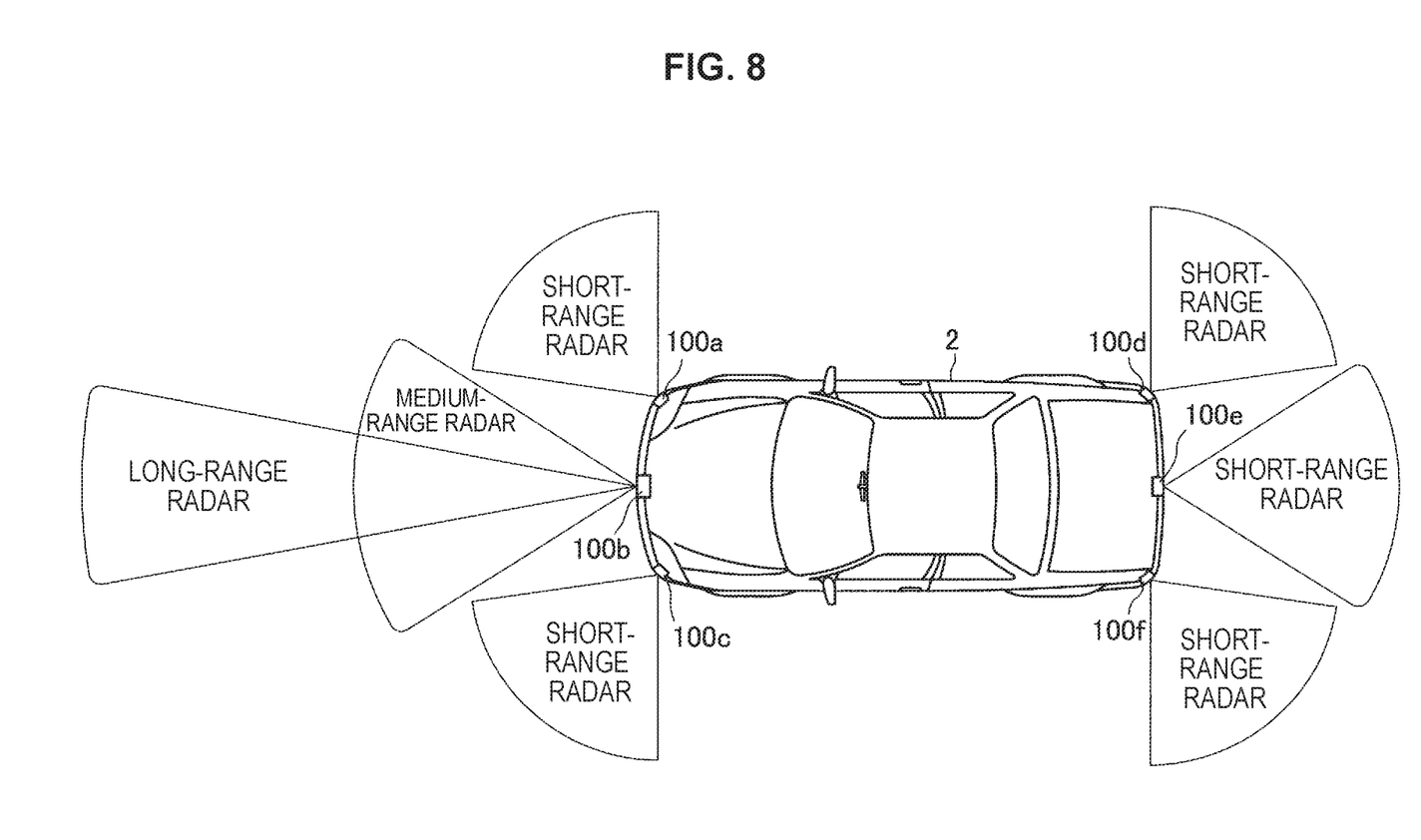
FIG. 8 is a diagram illustrated to describe an example of a vehicle on which the FMCW radar device is mounted.

FIG. 8 is a diagram illustrated to describe an example of a vehicle 2 on which FMCW radar devices 100a to 100f are mounted. The FMCW radar devices 100a to 100f illustrated in FIG. 8 are assumed to be any of the FMCW radar devices 100 according to the embodiment of the present disclosure described above. The FMCW radar devices 100a to 100f are any of radar devices for short-range, medium-range, and long-range, and are used for detecting objects or the like around the vehicle 2.

As described above, the FMCW radar device 100 according to the embodiment of the present disclosure is applicable as a radar device of a system supporting safe driving of a vehicle, so it is possible to contribute to higher performance of the system described above.

2. Concluding Remarks

According to the embodiment of the present disclosure as described above, there is provided an FMCW radar device capable of eliminating the influence of the beat signal caused by the local feedthrough and performing ranging with high accuracy.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, although the shift amount by the phase shifter is set to 180 degrees in the embodiment described above, the present technology is not limited to such example. The shift amount by the phase shifter is not necessarily set to exactly 180 degrees, but in one example, the shift amount by the phase shifter can fall within the range of 180 degrees±22.5 degrees, in which 22.5 degrees is an angle corresponding to π/8, and cos (π/8) is approximately 0.93. The subtraction for the beat signals obtained by a chirp two times makes it possible for the beat signal caused by the local feedthrough to be suppressed to 10% or less. Thus, it is possible to reduce significantly the influence of the beat signal caused by the local feedthrough without exactly setting the shift amount by the phase shifter to 180 degrees.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A radar device including:
an oscillator configured to oscillate a local signal;
a transmitting antenna configured to emit a transmission signal based on the local signal;
a receiving antenna configured to receive a reflected wave in which the transmission signal is reflected from a target;
a mixer configured to multiply the reflected wave and the local signal by each other to produce a multiplied signal; and
a first shifter provided between the oscillator and the mixer and configured to shift a phase of the local signal.

(2)

The radar device according to (1), further including:
a second shifter configured to shift a phase of a signal output by the first shifter between the first shifter and the transmitting antenna.

(3)

The radar device according to (1) or (2),
in which the first shifter sets a shift amount to a first value at first-time transmission of the transmission signal and sets the shift amount to a second value at second-time transmission of the transmission signal.

(4)

The radar device according to (3), including:
a calculation unit configured to perform subtraction between an output of the mixer at the first-time transmission of the transmission signal and an output of the mixer at the second-time transmission of the transmission signal.

(5)

The radar device according to (3) or (4),
in which a difference between the first value and the second value is approximately 180 degrees.

(6)

The radar device according to any of (3) to (5),
in which a difference between the first value and the second value is within a range of 180 degrees±22.5 degrees.

(7)

The radar device according to any of (1) to (6), further including:
a multiplier configured to multiply a frequency of a signal output by the first shifter by N times between the first shifter and the mixer.

(8)

The radar device according to (7), including:
a calculation unit configured to perform subtraction between an output of the mixer at first-time transmission of the transmission signal and an output of the mixer at second-time transmission of the transmission signal.

(9)

The radar device according to (7),
in which the first shifter sets a shift amount to a first value at first-time transmission of the transmission signal and sets the shift amount to a second value at second-time transmission of the transmission signal, and a difference between the first value and the second value is a value which becomes approximately 180 degrees when the difference is multiplied by N times and wrapped at 360.

(10)

The radar device according to (7),
in which the first shifter sets a shift amount to a first value at first-time transmission of the transmission signal and sets the shift amount to a second value at second-time transmission of the transmission signal, and a difference between the first value and the second value is within a range of 180 degrees±22.5 degrees when the difference is multiplied by N times and wrapped at 360.

(11)

The radar device according to any of (1) to (10), further including:
a multiplier configured to multiply a frequency of a signal output by the oscillator by N times between the oscillator and the first shifter.

(12)
The radar device according to any of (1) to (11),
in which the local signal is a signal whose frequency increases or decreases with time.
(13)
The radar device according to (12),
in which the local signal is a signal whose frequency linearly increases or decreases with time.
(14)
A signal processor including:
an oscillator configured to oscillate a local signal;
a mixer configured to multiply a reflected wave in which a transmission signal based on the local signal is reflected from a target and the local signal by each other to produce a multiplied signal; and
a first shifter provided between the oscillator and the mixer and configured to shift a phase of the local signal.
(15)
A signal processing method including:
oscillating, by an oscillator, a local signal;
emitting a transmission signal based on the local signal from a transmitting antenna;
receiving, by a receiving antenna, a reflected wave in which the transmission signal is reflected from a target;
multiplying, by a mixer, the reflected wave and the local signal by each other to produce a multiplied signal; and
shifting, by a shifter provided between the oscillator and the mixer, a phase of the local signal.
(16)
A mobile object including:
the radar device according to any of (1) to (13).

REFERENCE SIGNS LIST 2 vehicle
10 target
100 FMCW radar device
110 FMCW radar signal processor
111 beat signal memory
120 signal processing unit
121 local oscillator
122 power amplifier
123 phase shifter
123a phase shifter
123b phase shifter
124 mixer
125 phase shifter
126a transmission signal multiplier
126b local signal multiplier
130 transmitting antenna
140 receiving antenna

What is claimed is:
1. A radar device, comprising:
an oscillator configured to oscillate a local signal;
a transmitting antenna configured to emit a transmission signal based on the local signal;
a receiving antenna configured to receive a reflected wave in which the transmission signal is reflected from a target;
a mixer configured to multiply the reflected wave and the local signal by each other to produce a multiplied signal;
a first shifter provided between the oscillator and the mixer and configured to shift a phase of the local signal; and
a second shifter configured to shift a phase of a signal output by the first shifter between the first shifter and the transmitting antenna.
2. The radar device according to claim 1,
wherein the first shifter sets a shift amount to a first value at first-time transmission of the transmission signal and sets the shift amount to a second value at second-time transmission of the transmission signal.
3. The radar device according to claim 2, comprising:
a calculation unit configured to perform subtraction between an output of the mixer at the first-time transmission of the transmission signal and an output of the mixer at the second-time transmission of the transmission signal.
4. The radar device according to claim 2,
wherein a difference between the first value and the second value is approximately 180 degrees.
5. The radar device according to claim 2,
wherein a difference between the first value and the second value is within a range of 180 degrees±22.5 degrees.
6. The radar device according to claim 1,
wherein the local signal is a signal whose frequency increases or decreases with time.
7. The radar device according to claim 6,
wherein the local signal is a signal whose frequency linearly increases or decreases with time.
8. A mobile object, comprising:
the radar device according to claim 1.
9. A radar device, comprising:
an oscillator configured to oscillate a local signal;
a transmitting antenna configured to emit a transmission signal based on the local signal;
a receiving antenna configured to receive a reflected wave in which the transmission signal is reflected from a target;
a mixer configured to multiply the reflected wave and the local signal by each other to produce a multiplied signal;
a first shifter provided between the oscillator and the mixer and configured to shift a phase of the local signal;
a multiplier configured to multiply a frequency of a signal output by the first shifter by N times between the first shifter and the mixer.
10. The radar device according to claim 9, comprising:
a calculation unit configured to perform subtraction between an output of the mixer at first-time transmission of the transmission signal and an output of the mixer at second-time transmission of the transmission signal.
11. The radar device according to claim 9,
wherein the first shifter sets a shift amount to a first value at first-time transmission of the transmission signal and sets the shift amount to a second value at second-time transmission of the transmission signal, and a difference between the first value and the second value is a value which becomes approximately 180 degrees when the difference is multiplied by N times and wrapped at 360.
12. The radar device according to claim 9,
wherein the first shifter sets a shift amount to a first value at first-time transmission of the transmission signal and sets the shift amount to a second value at second-time transmission of the transmission signal, and a difference between the first value and the second value is within a range of 180 degrees±22.5 degrees when the difference is multiplied by N times and wrapped at 360.

13. The radar device according to claim 9,
wherein the first shifter sets a shift amount to a first value at first-time transmission of the transmission signal and sets the shift amount to a second value at second-time transmission of the transmission signal.

14. The radar device according to claim 13, comprising:
a calculation unit configured to perform subtraction between an output of the mixer at the first-time transmission of the transmission signal and an output of the mixer at the second-time transmission of the transmission signal.

15. The radar device according to claim 13,
wherein a difference between the first value and the second value is approximately 180 degrees.

16. The radar device according to claim 13,
wherein a difference between the first value and the second value is within a range of 180 degrees±22.5 degrees.

17. The radar device according to claim 9,
wherein the local signal is a signal whose frequency increases or decreases with time.

18. The radar device according to claim 17,
wherein the local signal is a signal whose frequency linearly increases or decreases with time.

19. The radar device according to claim 1, further comprising:
a multiplier configured to multiply a frequency of a signal output by the first shifter by N times between the first shifter and the mixer.

20. A radar device, comprising:
an oscillator configured to oscillate a local signal;
a transmitting antenna configured to emit a transmission signal based on the local signal;
a receiving antenna configured to receive a reflected wave in which the transmission signal is reflected from a target;
a mixer configured to multiply the reflected wave and the local signal by each other to produce a multiplied signal;
a first shifter provided between the oscillator and the mixer and configured to shift a base of the local signal; and
a multiplier configured to multiply a frequency of a signal output by the oscillator by N times between the oscillator and the first shifter.

\* \* \* \* \*